United States Patent [19]

Hashimoto et al.

[11] Patent Number: 4,603,354
[45] Date of Patent: Jul. 29, 1986

[54] IMAGE PICKUP DEVICE

[75] Inventors: Seiji Hashimoto, Yokohama; Tokuzo Kato, Ichikawa; Tsutomu Takayama, Kawasaki, all of Japan

[73] Assignee: Canon Kabushiki Kaisha, Tokyo, Japan

[21] Appl. No.: 500,186

[22] Filed: Jun. 1, 1983

[30] Foreign Application Priority Data

Jun. 9, 1982 [JP] Japan .................................. 57-99853
Jul. 23, 1982 [JP] Japan ................................ 57-128545
Jul. 23, 1982 [JP] Japan ................................ 57-128544

[51] Int. Cl.$^4$ ........................................... H04N 3/14
[52] U.S. Cl. ..................................... 358/213; 358/909
[58] Field of Search .................... 358/212, 213, 44; 357/24

[56] References Cited

U.S. PATENT DOCUMENTS

| 4,204,230 | 5/1980 | Sprague | 358/213 |
|---|---|---|---|
| 4,229,752 | 10/1980 | Hynecek | 357/24 |
| 4,314,278 | 2/1982 | Yoshida | 358/213 |
| 4,315,284 | 2/1982 | Stillwell | 358/213 |
| 4,475,125 | 10/1984 | Esser | 358/213 |
| 4,486,783 | 12/1984 | Tanaka | 358/213 |
| 4,489,350 | 12/1984 | Kimura | 358/213 |
| 4,498,106 | 2/1985 | Sato | 358/213 |
| 4,499,496 | 2/1985 | Tanaka | 358/213 |

Primary Examiner—Gene Z. Rubinson
Assistant Examiner—L. C. Schroeder
Attorney, Agent, or Firm—Fitzpatrick, Cella, Harper & Scinto

[57] ABSTRACT

An image pickup device for picking up an image of a subject by using a solid-state image pickup array having a number of photo-electric conversion cells arranged in a matrix is disclosed a selector for selecting a first mode in which signal charges of at least two of the photo-electric conversion cells are combinationally read and a second mode in which the signal charges are read separately for each of the photo-electric conversion cells is provided, and an amplification factor for the read signal is varied in accordance with the mode selected.

14 Claims, 16 Drawing Figures

FRAME MODE / FIELD MODE
SELECTION SIGNAL

FRAME MODE / FIELD MODE
SELECTION SIGNAL

FRAME MODE/FIELD MODE
SELECTION SIGNAL

FRAME MODE/FIELD MODE
SELECTION SIGNAL

IMAGE PICKUP DEVICE

BACKGROUND OF THE INVENTION

1. Field of the Invention

The present invention relates to an image pickup device having a solid-state image pickup array.

2. Description of the Prior Art

A so-called portable video device having a compact video camera and a compact video tape recorder (VTR) has been recently developed vigorously. In the future, an advanced form of 8 mm video device which has a video camera and a VTR in union will be dominant.

The compactness of electronic equipment largely depends on semiconductor technology. A photo-electric converter of the video camera is being changed from an image pickup tube to a solid-state image pickup array as the semiconductor technology is advanced. The solid-state image pickup array has many advantages over the image pickup tube.

Because of the use of a solid-state device, the equipment is compact, of low power consumption, suitable for mass production and free from burning.

Because of the development of the technology of the solid-state image pickup array having such advantages and the development of a compact magnetic recording apparatus, a silver halide photographing technology which uses a prior art silver halide film as a record medium has been significantly affected by a magneto-photographing or electronic photographing technology which does not need a developing process.

An operation mode of the VTR in which an image of a moving subject is recorded on the VTR and the recorded image is displayed on a TV screen is called a movie video, and an operation mode in which an image of a still subject is recorded on the VTR and the recorded image is displayed on the TV screen or printed by a printer is called a still video. There is no great difference between signal formats for the movie video and the still video because both signals are converted to standard television signal formats.

However, the image of the subject is usually continuously picked up in the movie video mode while the image of the subject is momentarily picked up in the still video mode like a conventional camera device. Accordingly, operation responses to an iris, a shutter, an AGC and a white balance are substantially different in those two modes and driving methods of the solid-state image pickup array are also different. Therefore, the device cannot be used for both modes when the presently available optical system and signal processing system are used.

It is, therefore, desirable to provide a camera unit for the movie video mode and a camera unit for the still video mode separately, but a cost-performance requirements for such a device will be met only after the device has been fully diffused throughout the market. Thus, in the present stage, it is advantageous to use one camera unit for both modes.

A problem encountered when the camera unit is used for both the movie video mode and the still video mode is a method for accumulating and reading charges of the solid-state image pickup array. The solid-state image pickup array includes an X-Y address type MOS array, an image sensor, an interline type CCD (IL-CCD) array and a frame transfer type CCD (FT-CCD) array. The FT-CCD is specifically explained here.

The FT-CCD comprises an image pickup unit having a plurality of photo-electric conversion cells for converting an image of a subject to electric charges, a memory for temporarily storing signal charges from the image pickup unit, a horizontal shift register for reading out the signal charges from the memory in timed relation with a television synchronizing signal and an on-chip amplifier for amplifying the signal charges from the horizontal shift register to produce a signal voltage.

When such an FT-CCD is used as a movie camera, the image pickup unit photo-electrically converts the image for one field period and the photo-electrically converted signal charges are transferred to the memory in a vertical blanking period by vertical transfer pulses of several MHz. The signal charges in the memory are transferred to the horizontal shift register in the next field period one horizontal scan at a time during a horizontal blanking period, and read out from the on-chip amplifier as a CCD signal. During this period, the image pickup unit is in the photo-electric conversion state. Thus, the photo-electric conversion and the vertical transfer are repeated for each field so that a continuous video signal is produced.

When the FT-CCD described above is used as a still camera, the image flickers for the following reason. The TV signal consists of one frame of video signal and produces one frame of image from two fields (odd and even fields) by an interlace operation. Accordingly, one frame signal constructed by the photo-electric conversions at different times causes the image to flicker, particularly for a fast moving subject, and the quality of the image is degraded.

The following two methods have been proposed to resolve the above problem.

In the first method, only the odd field (or even field) signals are utilized. The odd field signal is used for the next even field signal. However, this method degrades vertical resolution and it is not appropriate for the still image.

In a second method, the number of vertical cells of the image pickup unit is doubled, and a second horizontal shift register is provided between the image pickup unit and the memory so that an even field signal and an odd field signal are simultaneously produced on a plane of the image pickup unit and they are sequentially read out so that the solid-state image pickup unit can be used for both the movie video mode and the still video mode. Such a solid-state image pickup device has been proposed in U.S. Pat. No. 4,486,783, issued Dec. 4, 1984, to Tanaka et al., and assigned in common herewith.

This image pickup device is shown in FIG. 1, and the operation thereof is briefly explained below.

In FIG. 1, numeral 1 denotes an image pickup unit having a plurality of photo-electric conversion cells arranged in a matrix, numeral 2 denotes a memory for storing signal charges produced by the image pickup unit 1, numeral 3 denotes a first horizontal shift register for reading out the signal charges produced by the image pickup unit 1, numeral 4 denotes a second horizontal shift register for reading out the signal charges stored in the memory 2, and numerals 5 and 6 denote on-chip amplifiers for amplifying the signals read from the first and second horizontal shift registers 3 and 4, respectively. The image pickup device forms, as a whole, a frame transfer type CCD array. The number of vertical cells of the image pickup unit 1 is 490 and the number of vertical cells of the memory 2 is 245.

In the movie video mode, the signal charges of two vertically adjacent picture cells of the image pickup unit 1 are sequentially added in the first shift register 3 and the combined signal charges are transferred to the memory 2 and read out from the second shift register 4 through the on-chip amplifier 6 as a signal 1C.

In the still video mode, the following two operation modes are possible.

In a first mode, like in the movie video mode, the signal charges of two vertically adjacent picture cells of the image pickup unit 1 are added and the combined signal charges are stored in the memory 2, and the signal 1C is read from the second shift register 4 through the on-chip amplifier 6. (This mode is aclled a field mode.)

In a second mode, the signal charges of the odd vertical cells of the image pickup unit 1 are read from the first horizontal shift register 3 and the signals charges of the even vertical cells are read from the second horizontal shift register. (This mode is called a frame mode.)

In the frame mode, vertical resolution in the still video mode is not degraded and a fully interlaced signal is produced.

To compare the field mode and the still mode, the signal charges in the frame mode in which the signal charges of the respective cells are directly read are approximately one half of those in the field mode in which the signal charges of the two adjacent cells are added. That is, sensitivity of the camera is one iris step lower.

The on-chip amplifiers 5 and 6 are usually MOS devices. Considering the fact that the MOS device has a poor low frequency noise characteristic and that the eyes of human beings are sensitive to low frequency noise, the reduction of the S/N ratio by one iris step is not negligible.

The number of horizontal cells of the solid-state image pickup array, which is 390 or 570 in the current state of art, is rather smaller than required, and in the future, the number of horizontal cells will be increased. In addition, it is expected that the present ⅔ inch optical system will be reduced to a ½ inch optical system and an 8 mm optical system in the future. Thus, the sensitivity of the camera is an important problem.

When the image pickup device of FIG. 1 is operated in the frame mode, the even field signal and the odd field signal are read through separate output amplifiers. Thus, if there is a difference between the characteristics of the output amplifiers, the output levels differ from each other. In such a case, the vertical resolution is significantly reduced.

It has been found that the following problem occurs when the outputs of the first and second shift registers are mixed. When the outputs of the output amplifiers 5 and 6 are mixed, the noises of the amplifiers 5 and 6 are superimposed, and the S/N ratio is reduced and the quality of image is degraded.

SUMMARY OF THE INVENTION

It is an object of the present invention to provide an image pickup device which resolves the problems encountered when an image sensor capable of picking up two fields of images simultaneously and reading them out as two field signals is used.

It is another object of the present invention to provide an image pickup device which produces the same signal level in the frame mode and the field mode.

It is an other object of the present invention to provide an image pickup device of a low noise in the frame mode.

It is a further object of the present invention to provide an image pickup device which preferentially selects one of an S/N ratio and a resolution depending on the brightness of a subject.

The other objects and features of the present invention will be apparent from the following description of the present invention.

DETAILED DESCRIPTION OF THE PREFERRED EMBODIMENTS

Figure 2:
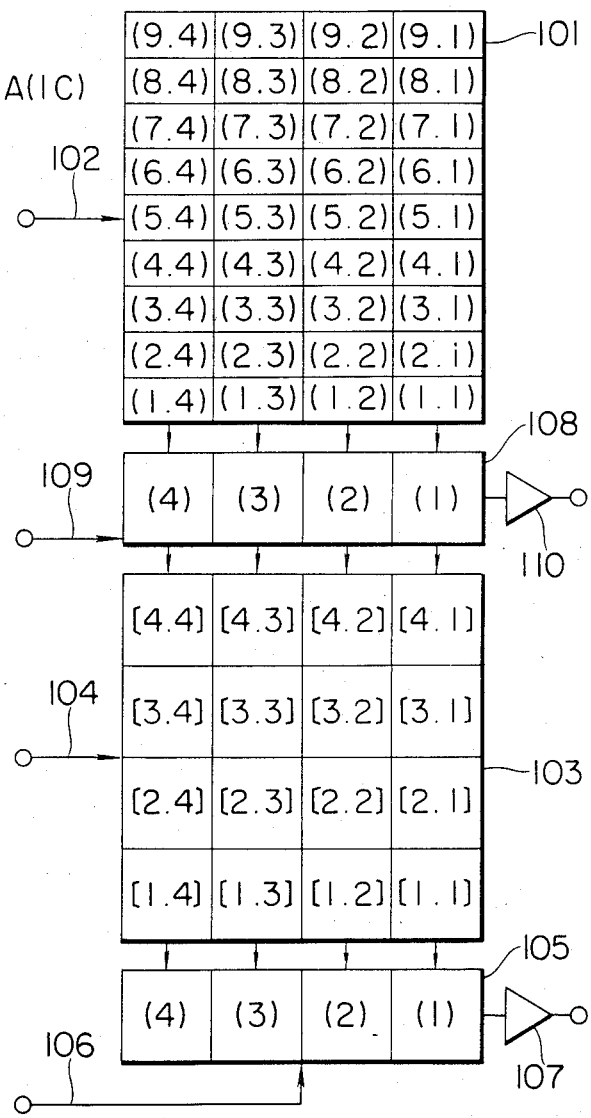
FIG. 2 shows a diagram of the CCD array of FIG. 1.

FIG. 2 shows a configuration of a frame transfer type CCD array of an image pickup device to which the present invention can be applied.

In FIG. 2, numeral 101 denotes an image pickup unit of the frame transfer type CCD array. For the NTSC system, the number of vertical cells of the image pickup unit 101 is selected to be substantially equal to the number of scan lines, that is, approximately 490. It is about double of that of a conventional frame transfer type CCD array. The number of horizontal cells of the image pickup unit 101 is usually 390 or 570 to comply with a color sub-carrier frequency.

In the image pickup unit 101 of FIG. 2, only 9 vertical cells and 4 horizontal cells are shown. Numeral 102 denotes an electrode for applying a voltage to accumulate charges in the image pickup unit 101 and transfer them therefrom.

Numeral 103 denotes a memory array having vertical cells the number of which is approximately one half of that of the image pickup unit 101 and horizontal cells the number of which is equal to that of the image pickup unit 101. Accordingly, the memory array 103 comprises the same number of cells as that of the conventional frame transfer type CCD memory array.

Numeral 104 denotes an electrode for applying a voltage to transfer the charges, like the electrode 102 of the image pickup unit 101.

Numeral 105 denotes a second horizontal shift register as readout means and it comprises a line of charge transfer unit consisting of substantially same number of cells as those of the horizontal cells of the image pickup unit 101 and the memory array 103.

Numeral 106 denotes an electrode for applying a voltage to transfer the charges of the horizontal shift register 105.

Numeral 107 denotes an amplifier as conversion means for converting the charges transferred from the horizontal shift register 105 to a voltage output.

A first horizontal shift register 108 as readout means which is substantially identical to the second horizontal shift register 105 is arranged between the image pickup unit 101 and the memory array 103. Numeral 109 denotes an electrode for applying a voltage to transfer the charges of the first horizontal shift register 108, and numeral 110 denotes an amplifier as conversion means for converting the transferred charges to a voltage.

To transfer the charges, any of such conventional methods as single-phase drive, 2-phase drive, 3-phase drive and 4-phase drive may be used. For the sake of simplification of the description, the single-phase drive method is explained here and the constructions of the first horizontal shift register 108 and the memory array 103 are explained with reference to FIG. 3.

The single-phase drive method is disclosed in the U.S. Pat. No. 4,229,752 and hence the detail thereof is not explained here.

Figure 3:
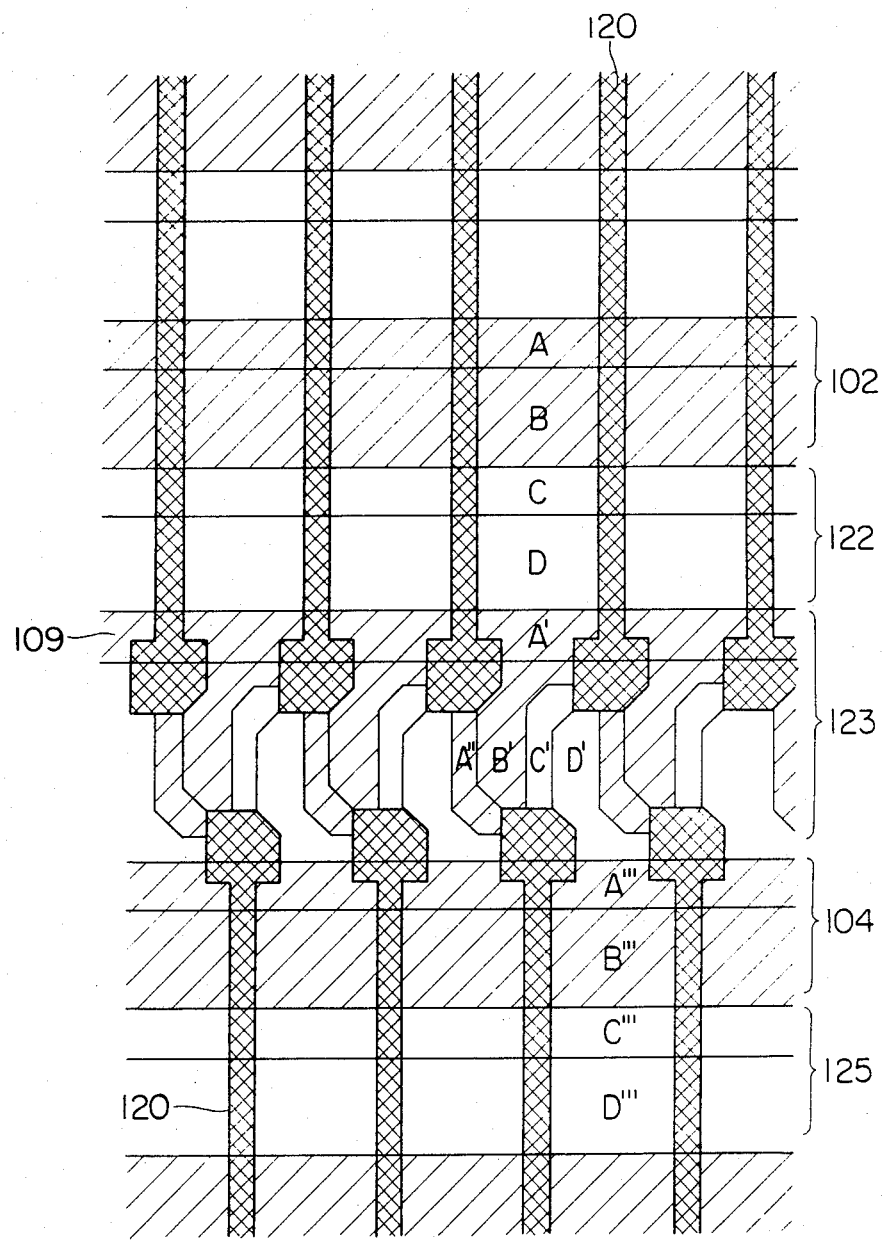
FIG. 3 shows a diagram of a portion of the CCD array of FIG. 1.

In FIG. 3, numeral 120 denotes channel stops for preventing charge leakage between the horizontal cells. Numeral 102 denotes the poly-silicon electrode of the image pickup unit for accumulating and transferring the charges. A region in which the electrode 102 is formed comprises two regions A and B of different potential states, in a silicon substrate. Numeral 122 denotes a virtual electrode region in the silicon substrate, which comprises regions C and D of different potential states in the silicon substrate.

Vertically, the regions A, B, C and D form one cell.

Numeral 123 denotes a first horizontal shift register region. In this region, the poly-silicon electrode 109 is formed in comb shape as shown by a hatched area, and regions A', A'', B' and C' of different potential states are present under the poly-silicon electrode 109. The regions A' and A'' are of the same potential states, but they are isolated by the channel stop 120. The regions C' and D' have the same potential state as that of the virtual electrode 122 of the image pickup unit. The electrodes 104 and 125 are constructed in the same manner as the electrodes 102 and 122 of the image pickup unit except that the charge storage capacities of the electrodes 104 and 125 are approximately double of those of the electrodes 102 and 122.

Figure 4:
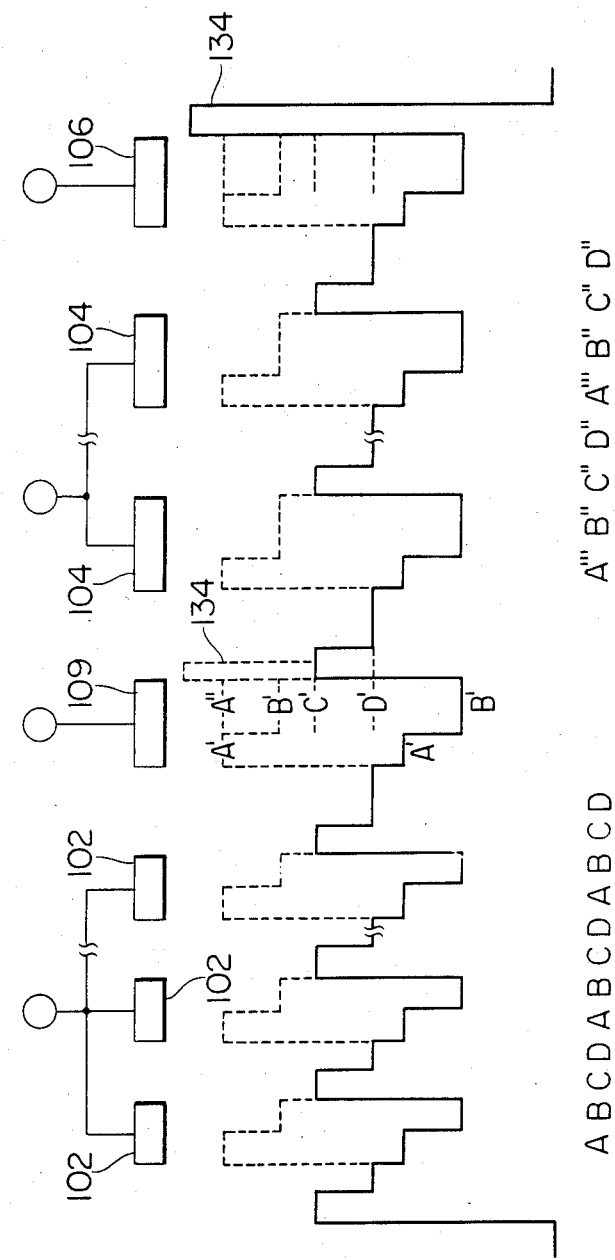
FIG. 4 shows an internal potential state of the CCD array of FIG. 1.

FIG. 4 shows an internal potential state of the CCD array of FIG. 3.

Numeral 102 denotes the poly-silicon electrodes of the image pickup unit. All of the poly-silicon electrodes 102 of the image pickup unit are connected in parallel and a voltage for transferring the charges is applied thereto. The area under each of the polysilicon electrodes 102 is divided into the regions A and B, as shown in FIG. 3, and the region A has a higher potential state, as viewed by electrons, than the region B. Broken lines in FIG. 4 show the potential when the poly-silicon electrode 102 is at low level, and solid lines show a potential when the poly-silicon electrode 102 is at high level.

As shown in FIG. 4, the potential of the region C of the virtual electrode 122 of FIG. 3 is slightly higher than the potential of the region D. The potentials of those regions do not depend on the voltage applied to the electrode 102 but are always kept constant. Thus, by applying a constant voltage to the poly-silicon electrode 102, the charges are accumulated, and by applying a pulsive voltage, the charges are transferred.

Numeral 109 in FIG. 4 denotes the poly-silicon electrode of the first horizontal shift register. An internal potential state of the horizontal shift register is shown below the poly-silicon electrode 109 of FIG. 4.

Numeral 104 in FIG. 4 denotes the poly-silicon electrode of the memory array. An internal potential state of the memory array is the same as that of the image pickup unit. Numeral 106 denotes the electrode of the second horizontal shift register (105 in FIG. 2). The construction is same as that of the first horizontal shift register except that one end thereof is closed by the channel stop. The movement of the charges in the second horizontal shift register is now explained. The charges accumulated in the region B of the image pickup unit are transferred into the potential well region D of the electrode 122 in FIG. 3 when a low level pulse voltage is applied to the poly-silicon electrode 102 to raise the potentials of the regions A and B as shown by the broken lines. If a high level potential is applied at this time to the polysilicon electrode 109 of the second horizontal shift register, the potentials of the regions A' and B' assume the potential states as shown by the solid lines in FIG. 4 and the charges in the region D are transferred to the region B' through the region A'. Then, when a low level potential is applied to the electrode 109, the potentials of the regions A' and B' assume the potential states as shown by the broken lines and the charges in the region B' are transferred to the region D' (having the constant potential shown by the broken line) through the region C' (having the constant potential shown by the broken line). When the high level voltage is applied to the poly-silicon electrode 104 of the image pickup unit, the potentials of the regions A''' and B''' fall below the potential of the region D' and the charges in the region D' are transferred to the region B''' through the region A'''.

When the low level potential is applied to the poly-silicon electrode 104 of the memory array, the potentials of the regions A''' and B''' assume the potential states shown by the broken lines and the charges transferred to the region B'' of the memory array are transferred to the region D'' through the region C''. When the pulse voltage is applied to the electrode 104 as a drive signal, the accumulated charges are sequentially transferred from the region B'' through the region D'' and the region B'' to the first horizontal shift register 105, whence they are read out from the first horizontal shift register 105.

A flow of charges when the signal is read out from the first horizontal shift register is now explained.

The charges transferred to the region D' are transferred to the memory array by applying the high level potential to the poly-silicon electrode 104 of the memory array. By applying the low level voltage to the electrode 104 to keep the potentials of the regions A''' and B''' at the potential states shown by the broken lines and applying the pulse voltage to the poly-silicon electrode 109 of the first horizontal shift register to change the potentials of the regions A'' and B' alternately to the potential states shown by the solid lines and the broken lines, the charges in the region D' are transferred horizontally A''→B'→C'→D' and the signal is read out through the amplifier (110 in FIG. 2).

An operation as a camera device is now explained with reference to FIGS. 5A and 5B.

Figure 5A:
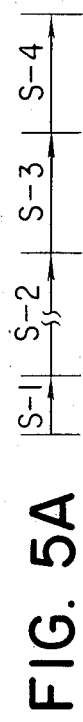
FIG. 5A shows a sequence chart for the CCD array of FIG. 1 when it is operated in a still video mode.
Figure 5B:
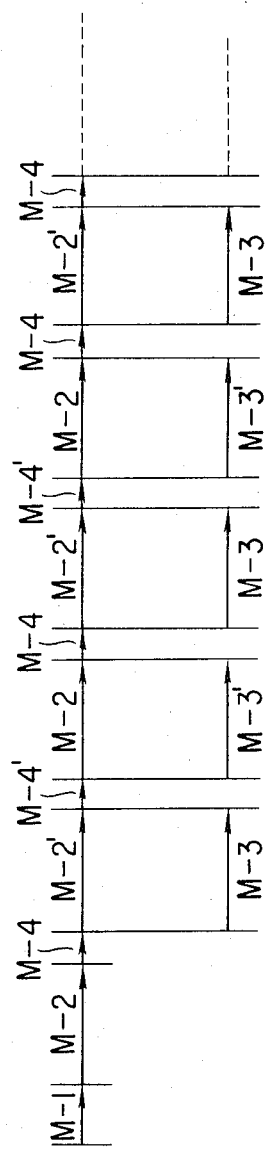
FIG. 5B shows a sequence chart for the CCD array of FIG. 1 when it is operated in a movie video mode.

FIG. 5A shows an operation status chart in the still video mode and FIG. 5B shows an operation status chart in the movie video mode.

The operation in the still video mode is first explained.

A step S-1 in FIG. 5A shows an all-clear state in which the charges accumulated by a dark current are cleared through an anti-blooming drain or swept out by operating the CCD array at a high speed, immediately before an exposure operation.

Then, a shutter is opened to start the exposure operation or the accumulation of the charges by the image pickup unit (S-2). Then, a first field of the first horizontal shift register 108 is read out (S-3).

After the predetermined period of exposure in the step S-2, the shutter is closed and the image signals (charges) are accumulated in the respective cells of FIG. 2, and the charges accumulated in the cells of the image pickup units are vertically transferred two lines at a time in the step S-3. In the example of FIG. 2, the charges accumulated in the cells (1.1)–(1.4) are transferred to the cells [4.1]–[4.4] of the memory array through the first horizontal register 108, and the charges accumulated in the cells (2.1)–(2.4) are transferred to the first horizontal register 108. Similarly, the charges accumulated in the cells of the respective lines are transferred two lines at a time. As a result, the charges accumulated in the cells (3.1)–(3.4), (4.1)–(4.4), (5.1)–(5.4), (6.1)–(6.4), (7.1)–(7.4), (8.1)–(8.4) and (9.1)–(9.4) are transferred to the cells (1.1)–(1.4), (2.1)–(2.4), (3.1)–(3.4), (4.1)–(4.4), (5.1)–(5.4), (6.1)–(6.4) and (7.1)–(7.4), respectively.

After the two lines of charges have been transferred, the charges transferred to the first horizontal shift register 108 are sent out through the amplifier 110. As a result, the charges transferred to the horizontal shift register 108, that is, the charges accumulated in the cells (2.1)–(2.4) in the exposure operation are serially read out.

Thereafter, the charges accumulated in two lines of cells of the image pickup unit are again transferred. As a result, the charges transferred to the cells (1.1)–(1.4), that is, the charges accumulated in the cells (3.1)–(3.4) during the exposure, are transferred to the cells [4.1]–[4.4] of the memory array through the horizontal register 108, and the charges transferred to the cells (2.1)–(2.4), that is, the charges accumulated in the cells (4.1)–(4.4) during the exposure, are transferred to the horizontal register 108. The charges transferred to the cells of the respective lines of the memory array 103 are transferred by one line. Accordingly, the charges previously transferred to the cells [4.1]–[4.4], that is, the charges accumulated in the cells (1.1)–(1.4) during the exposure, are transferred to the cells [3.1]–[3.4]. Then, the charges transferred to the horizontal register 108 are read so that the charges transferred to the horizontal register 108, that is, the charges accumulated in the cells (4.1)–(4.4) during the exposure are serially sent out.

Thereafter, the transfer operation of the charges accumulated in two lines of the cells of the image pickup unit 101 and the charges transferred to one line of the cells of the memory array 103, and the read operation of the charges transferred to the horizontal shift register 108 are alternately carried out so that the charges accumulated in the cells (2.1)–(2.4), (4.1)–(4.4), (6.1)–(6.4) and (8.1)–(8.4) during the exposure are sequentially read out from the first horizontal register 108. In this manner, the first field is read. Further, the charges accumulated in the cells (1.1)–(1.4), (3.1)–(3.4), (5.1)–(5.4) and (7.1)–(7.4) during the exposure are transferred to the cells [1.1]–[1.4], [2.1]–[2.4], [3.1]–[3.4] and [4.1]–[4.4] of the memory array, respectively. After the first field has been read, the read operation of the second field, that is, a step S-4, starts. In the step S-4, one line of charges transferred to the cells of the respective lines of the memory array is transferred and the charges transferred to the second horizontal shift register 105 are read out. Thus, the charges accumulated in the cells (1.1)–(1.4), (3.1)–(3.4), (5.1)–(5.4), (7.1)–(7.4) and (9.1)–(9.4) during the exposure are sent out from the horizontal register 105. In this manner, the second field is read.

In accordance with the present invention, one frame of image signal recorded at one time point can be read out in the first field and then in the interlaced second field, in the same manner as a conventional television operation. The first horizontal shift register 108 functions as the horizontal shift register and a parallel-in parallel-out shift register.

The operation when the device is operated in the movie video mode to produce a moving picture video signal is now explained.

A step M-1 in FIG. 5B corresponds to the step S-1 in FIG. 5A. This step is not absolutely essential.

The shutter operation is not necessary in this case and the accumulation and the readout are parallelly repeated. Steps M-2, M-2', . . . show accumulation steps and a prime symbol indicate a second field. The charges (first field) accumulated in the step M-2 are read out in a step M-3, and the charges (second field) accumulated in the step M-2' are read out in a step M-3'.

A step M-4 shows a step for transferring the charges accumulated in the image pickup unit to the memory array.

The frame transfer type CCD array of the present embodiment has 490 vertical cells of the image pickup unit and 245 vertical cells of the memory array. Therefore, the operation of transfer from the image pickup unit to the memory array and the interlace method are different from those of the conventional frame transfer type CCD array. The operation is explained with reference to FIG. 2.

In the step M-2, the exposure and the accumulation are carried out, and in the step M-4, the charges accumulated in the image pickup unit are transferred to the memory array. In the transfer operation, the charges accumulated in the cells (1.1), (1.2), (1.3) and (1.4) are first transferred to the cells [4.1], [4.2], [4.3] and [4.4] of the memory array 103 through the first horizontal shift register 108 Then, the charges in the cells (2.1), (2.2), (2.3) and (2.4) are transferred to the cells [4.1], [4.2], [4.3] and [4.4].

At this step, the pulse voltage is not applied to the memory array and the charges accumulated in the cells (1.1)–(1.4) during the exposure are held in the cells

[4.1]-[4.4]. As a result, the charges accumulated in the two lines of cells (1.1)-(1.4) and (2.1)-(2.4) of the image pickup unit are combined in the cells [4.1]-[4.4].

Then, one line of charges of the memory cells are transferred. That is, the charges combined in the cells [4.1]-[4.4] are transferred to the cells [3.1]-[3.4], and two lines of charges in the image pickup unit, that is, the charges accumulated in the cells (3.1)-(3.4) and (4.1)-(4.4) during the exposure are transferred to the cells [4.1]-[4.4] and combined therein. Thereafter, the transfer operation of one line of charges of the memory array and the transfer and combine operations of two lines of charges of the image pickup unit to the cells [4.1]-[4.4] are repeated so that the combined charges of the cells (1.1)-(1.4) and (2.1)-(2.4) are transferred to the cells [1.1]-[1.4] of the memory array, the combined charges of the cells (3.1)-(3.4) and (4.1)-(4.4) are transferred to the cells [2.1]-[2.4], the combined charges of the cells (5.1)-(5.4) and (6.1)-(6.4) are transferred to the cells [3.1]-[3.4] and the combined charges of the cells (7.1)-(7.4) and (8.1)-(8.4) are transferred to the cells [4.1]-[4.4].

Thereafter, the exposure and accumulation operations are carried out in the steps M-2' and M-3 and the charges transferred to the memory array 103 are transferred to the horizontal shift register 105 sequentially, one line at a time, and the signals transferred to the horizontal shift register 105 are sent out from the horizontal shift register 105. In this manner, the first field is read out.

After the first field has been read, the charges accumulated in the image pickup unit 101 in the step M-2' are transferred to the memory array 103 in the step M-4. Since this is the read operation for the second field, the cells are shifted one line when the charges are transferred from the image pickup array 101 to the cells [4.1]-[4.4] so that two lines of charges of the image pickup unit are transferred.

For the second field, the charges accumulated in the cells (2.1)-(2.4), (3.1)-(3.4), (4.1)-(4.4), (5.1)-(5.4), (6.1)-(6.4) and (7.1)-(7.4) are transferred to the cells [4.1]-[4.4] and combined therein and the combined charges are transferred to the respective lines of the memory array 103. Then, in the step M-3', the charges accumulated in the memory array 103 are transferred to the horizontal register 105. Thus, the second field has been read out. When the two lines of charges of the image pickup unit are to be combined, the transfer and combine operation of the first field and the transfer and combine operation of the second field are shifted by one line so that the interlaced signal of the first field is produced. Thus, the image can be picked up as a video camera.

At this time, the first horizontal shift register 108 is used as the parallel-in parallel-out register and it does not function as the horizontal shift register.

Since the charges of the cells of the image pickup unit are combined two lines at a time and the combined charges are accumulated in the cells of the memory array, the capacity of the cells of the memory array must be approximately two times as large as the capacity of the cells of the image pickup unit. The larger the number of cells to be combined is, the larger is the capacity of the cells of the memory array. However, when the device is exclusively used for the still video mode, the capacity of the memory array may be substantially equal to the capacity of the image pickup unit.

Figure 6:
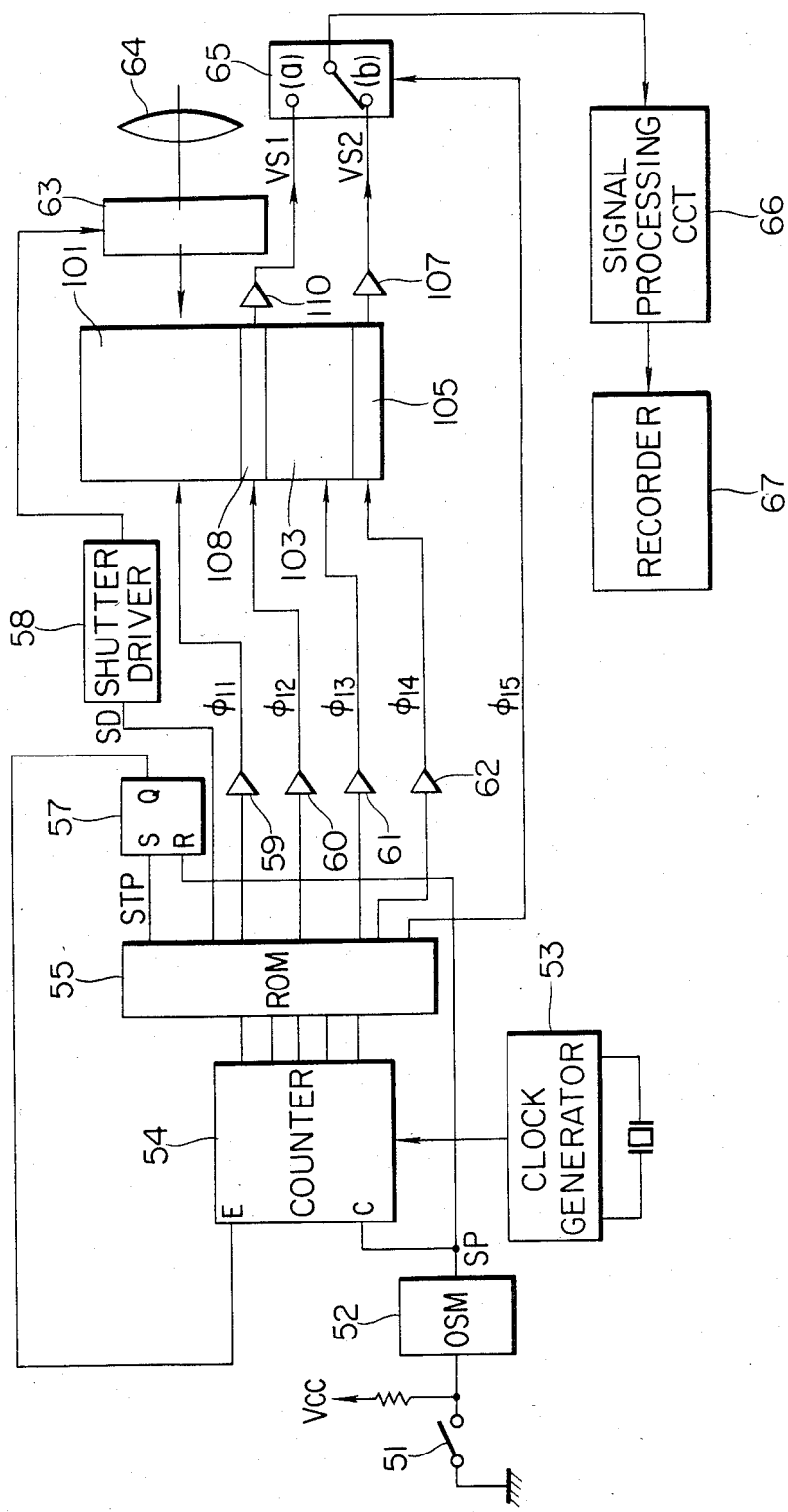
FIG. 6 shows a control block diagram of an image pickup device which uses the CCD array of FIG. 1.
Figure 7:
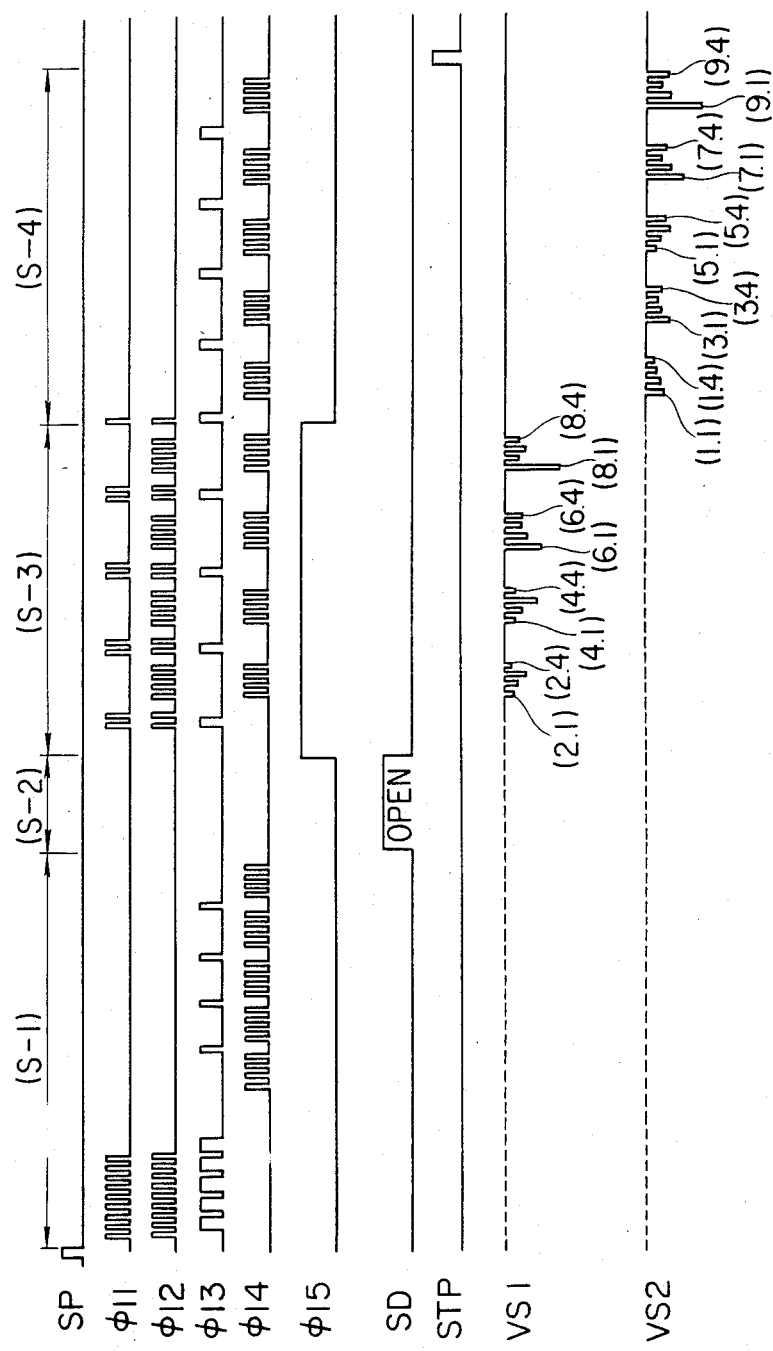
FIG. 7 shows a timing chart for the circuit of FIG. 6 in the still video mode.

FIG. 6 shows one embodiment of a drive circuit of the present invention, and FIG. 7 shows a timing chart of the circuit of FIG. 6 when it is operated in the still video mode.

In FIG. 7, when CCD drive clock signals $\phi 11$, $\phi 12$, $\phi 13$ and $\phi 14$ are at high level, a small positive or negative potential is applied to the electrode, and when they are at low level, a large negative voltage is applied to the electrode.

In FIG. 6, numeral 51 denotes a start switch, numeral 52 denotes a monostable multivibrator, numeral 53 denotes a clock generator, numeral 54 denotes a counter, numeral 55 denotes a ROM (read-only memory) which stores a conversion table for counter contents and signals such that the signals are produced in a manner shown in FIG. 7, numeral 57 denotes an RS flip-flop, numeral 58 denotes a shutter driver, numerals 59-62 denote buffer amplifiers for driving the CCD array, numeral 63 denotes a shutter, numeral 64 denotes an optical lens, numeral 65 denotes a switching circuit, numeral 66 denotes a signal processing circuit for converting the output of the CCD array to a recording signal, and numeral 67 denotes a recorder for recording the video signal on a magnetic disc.

The operation in the still video mode is now explained with reference to FIG. 7.

When the start switch 51 is depressed, a start pulse SP is produced, the counter 54 is cleared and the counter 54 is incremented by the output clock from the clock generator 53. The output of the counter 54 is supplied to the ROM 55. The ROM 55 produces signals in accordance with the time chart of FIG. 7.

In the step S-1, the charges of the cells of the CCD array are cleared. To this end, a small positive or negative voltage as shown by the clock pulse $\phi 13$ is applied to the electrode of the memory array, and the clock pulses $\phi 11$ and $\phi 12$ which are two times as high frequency as the clock pulse $\phi 13$ are applied. Thus, the charges of the cells of the image pickup unit 101 are combined two vertical cells respectively and they are transferred to the cells of the memory array 103. They are then serially read out from the horizontal shift register 105 by a clock pulse $\phi 14$. After the clear operation, the step S-2 is started and the shutter 63 is opened, the image pickup 101 is exposed and the charges are accumulated in the cells. Then, the shutter 63 is closed to terminate the exposure operation, and the read operation of the first field is started (S-3). When the electrode of the memory array 103 is at high level, two pulses $\phi 11$ and two pulses $\phi 12$ are produced and the charges in the cells (1.1)-(1.4) are transferred to the cells [4.1]-[4.4] and the charges in the cells (2.1)-(2.4) are transferred to the first horizontal shift register 108. After this step, the potential of the electrode of the memory array 103 assumes the low level. Thus, a potential barrier is formed between the first horizontal shift register 108 and the memory array 103. Thereafter, four clocks $\phi 12$ are produced so that the charges accumulated in the cells (2.1)-(2.4) during the exposure are read out from the first horizontal shift register 108 through the amplifier 110. Then, the potential barrier between the first horizontal shift register 108 and the memory array 103 is removed and two clocks $\phi 11$ and two clocks $\phi 12$ are produced so that the charges in the cells (3.1)-(3.4) are transferred to the cells [4.1]-[4.4] and the charges in the cells (4.1)-(4.4) are transferred to the first horizontal shift register 108.

By repeating the above operations, the charges in the cells (2.1)–(2.4), (4.1)–(4.4), (6.1)–(6.4), . . . (8.1)–(8.4) are sequentially read out from the first horizontal shift register 108. Thus, the signal VS1 of the first field is read. At this time, the charges accumulated in the cells (1.1)–(1.4) during the exposure are transferred to the horizontal shift register 105 by the clock pulse $\phi13$, and the charges of the other odd lines are accumulated in the memory array 103.

The read operation of the second field is then started (S-4). In the step S-4, the second field signal VS2 is sequentially read out from the horizontal shift register 105 through the amplifier 107 by four clock pulses $\phi14$ generated for every pulse $\phi13$. That is, the charges accumulated in the cells (1.1)–(1.4), (3.1)–(3.4) and (9.1)–(9.4) during the exposure are sequentially read out. When the charge in the cell (9.4) has been read out, an end signal STP is produced and the counter 54 stops the count operation.

The video signals VS1 and VS2 are supplied to the switching circuit 65. The switching circuit 65 selects a contact (b) in the steps S-1 and S-2 by a signal $\phi15$ and it selects a contact (a) in the read period of the first field (S-3), and again selects the contact (b) in the read period of the second field (S-4).

Thus, the video signals are selectively supplied to the signal processing circuit 66 through the switching circuit 65 during the read periods of the respective fields. Since the input signal line is switched, the noises generated in the on-chip amplifiers 110 and 117 of the CCD array are not combined and a high S/N ratio signal is produced. Thus, a high quality of image if reproduced.

In the movie video mode, the switching circuit 65 always selects the contact (b).

As described above, the image pickup device of the present invention uses the charge transfer device which comprises the image pickup unit having the plurality of photo-electric conversion cells arranged in matrix, the memory array for storing signal charges accumulated in the image pickup unit, the second shift register for reading out the signal charges in the memory array, and the first shift register arranged between the image pickup unit and the memory array for reading out the signal charges in the image pickup unit. Accordingly, the image signal of the subject produced at one time by the image pickup unit can be read out of the respective shift register as two mutually interlaced field signals. Therefore, the conversion to the conventional television signal is easy and hence the present invention is suitable to the still video mode.

Further, since the input signal line to the signal processing circuit is switched for each read period of the field signal, the noises of the amplifiers for converting the signal charges of the transfer device to the voltages are not combined and a high S/N ratio signal is produced.

Figure 1:
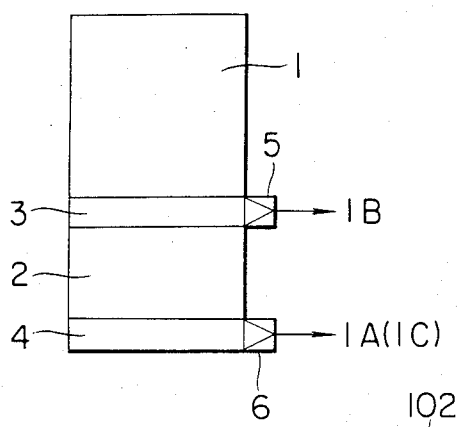
FIG. 1 shows a schematic view of a frame transfer type CCD array to which the present invention is applied.
Figure 8:
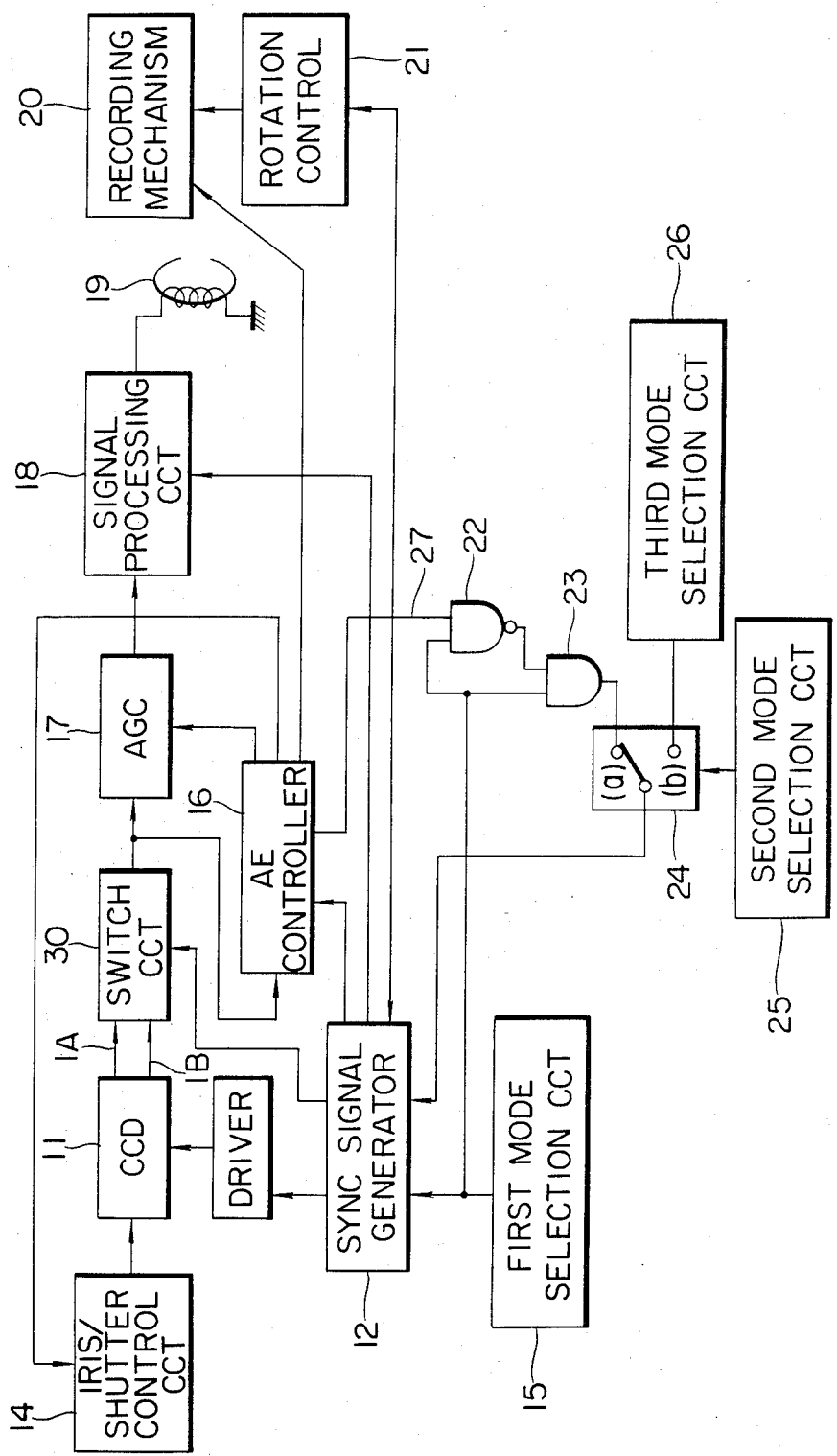
FIG. 8 shows a control circuit of the image pickup device in accordance with a second embodiment of the present invention.

FIG. 8 shows a second embodiment of the image pickup device of the present invention. In the present embodiment, a difference between levels of the read signals due to the difference of the reading method from the solid-state image pickup device as shown in FIG. 1 can be compensated.

The second embodiment is now explained with reference to FIG. 8, in which numeral 11 denotes an FT-CCD as shown in FIG. 2 having approximately 570 horizontal cells and approximately 490 vertical cells. Numeral 12 denotes a driver for the CCD 11 as combine control means, numeral 13 denotes a synchronizing signal generator for generating pulses to drive the CCD 11, numeral 14 denotes an iris/shutter control circuit for controlling a light intensity applied to the CCD 11, numeral 15 denotes a first mode selection circuit for selecting the movie video mode and the still video mode, numeral 40 denotes an AE controller as luminance determination means for determining an aperture value of an iris and a shutter speed based on the output signal of the CCD 11, numeral 17 denotes an automatic gain controller (AGC) for variably controlling a signal level if the signal level is low even when the AE controller 16 fully opens the iris, numeral 18 denotes a signal processing circuit including a processing circuit, encoder circuit and a modulation circuit for converting the output signal of the AGC 17 to a recording signal, numeral 19 denotes a record head, numeral 20 denotes a recording mechanism including a motor, numeral 21 denotes a rotation controller for controlling a speed and a phase of the motor of the recording mechanism 20 by a control pulse from the synchronizing signal generator 13, numeral 22 denotes a NAND gate, numeral 23 denotes an AND gate, numeral 24 denotes a switching circuit, numeral 25 denotes a second mode selection circuit for selecting manual or automatic selection of the frame mode and the field mode in the still video mode, and numeral 26 denotes a third mode selection circuit for selecting the frame mode or the field mode when the manual mode is selected by the circuit 25. The circuits 22–26 form indication means. Numeral 30 denotes a switching circuit including an amplifier as level adjusting means.

When the movie video mode is selected by the first mode selection circuit 15, the output of the selection circuit 15 assumes a low level (L) and the synchronizing signal generator 13 generates a movie video mode control pulse in response thereto. When a trigger switch, not shown, is depressed, a power is supplied to the circuits to start the record operation. Since the continuous recording is carried out in the movie video mode, the AE controller 16 which controls the iris and the AGC 17 carries out the feedback control with an appropriate time constant. The reading mode of the CCD 11 is set to the field mode and the signal is read from the second horizontal register 105 of FIG. 2 through the on-chip output amplifier 107.

When the first mode selection circuit 15 selects the still video mode, the output of the mode selection circuit 15 assumes a high level (H) to instruct to the synchronizing signal generator 13 to generate a still video mode control pulse. The AE controller 16 determines the shutter speed and the aperture value of the iris and conveys them to the iris/shutter control circuit 14. The still video mode has the field mode and the frame mode as described above. In order to select the field mode or the frame mode automatically, the switching circuit selects the contact (a). In the automatic selection mode, if the AE controller 16 detects that the luminance of the subject is low, an output line 27 assumes the H level. Thus, an output of a NAND gate 22 assumes L and an output of an AND gate 23 assumes L so that the synchronizing signal generator 13 is set to the field mode of the still video mode. If the luminance of the subject is not low, the output line 27 is H, the output of the NAND gate 22 is H and the output of the AND gate 23 is H so that the synchronizing signal generator 13 is set to the frame mode of the still video mode.

When the second mode selection switch 25 selects the manual selection mode, the switching circuit 24 selects the contact (b) and the setting by the third mode selection circuit 26 is checked. The third mode selection circuit 26 can select either the field mode or the frame mode in the still video mode.

When the field mode is selected in the still video mode, a high S/N ratio image can be produced even if the luminance of the subject is low. Even if the luminance of the subject is high, a soft focus or out-of-focus image can be produced.

When the frame mode is selected, a high resolution, sharp image is produced.

As described above, in the field mode, the output of the second horizontal shift register of FIG. 2 is used, and in the frame mode, the first and second horizontal shift registers are used, and the signals in the respective modes are selectively outputted through the switching circuit 30. The operation of the switching circuit 30 is now explained in detail.

Figure 9:
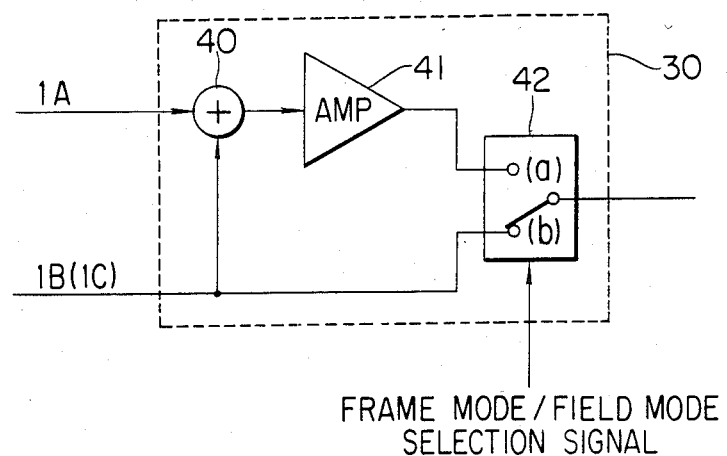
FIGS. 9, 10 and 11 show circuit diagrams of a switching circuit 30 of FIG. 8.

FIG. 9 shows a first embodiment of the switching circuit 30. Numeral 40 denotes an adder, numeral 41 denotes an amplifier and numeral 42 denotes a switch. In the frame mode, the signals 1A and 1B from the first and second horizontal registers are added together by the adder 40 and the sum signal is adjusted by the amplifier 41 so that the level thereof is equal to the level of the signal 1C from the second horizontal register in the field mode. In the field mode, the signal is directly supplied to the switching circuit 42 without routing the amplifier 41. The switching circuit 42 selects the contact (a) in the frame mode and selects the contact (b) in the field mode. Thus, a difference between the read signal levels of the frame mode and the field mode is eliminated. Since the signal level is adjusted before the signal is applied to the AE controller 16, the complexity of the succeeding circuits is prevented.

Figure 10:
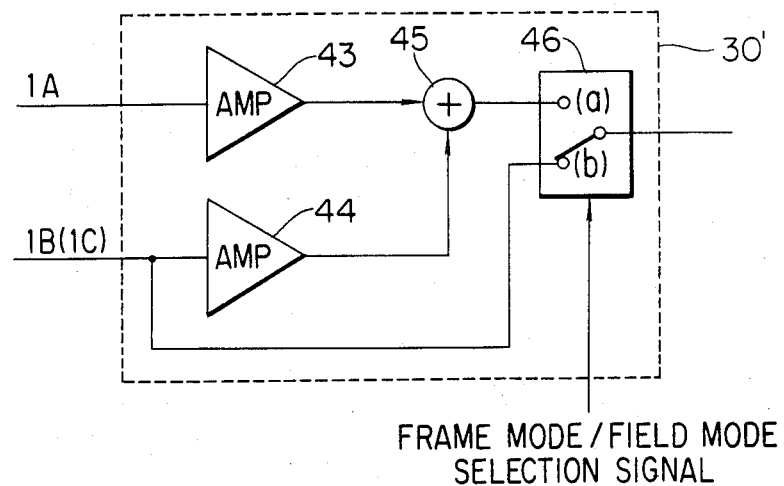
Figure 11:
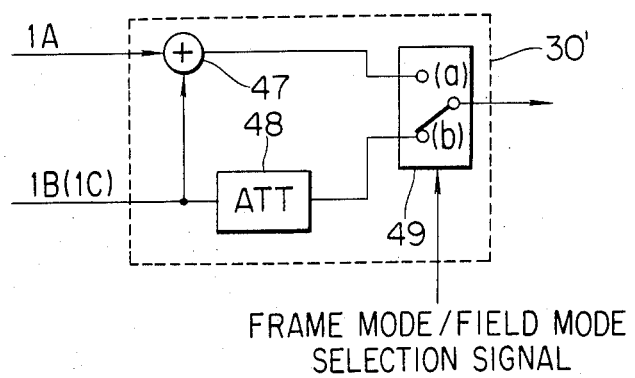

FIGS. 10 and 11 show second and third embodiments 30' and 30" of the switching circuit 30.

In FIG. 10, in order to fix the gain adjustment of the on-chip amplifiers 110 and 107 of the CCD array or a total gain of the image pickup unit 101, the memory array 103, the shift registers 105 and 108 and the on-chip amplifiers 107 and 110, in the frame mode, the signals 1A and 1B are amplified by separate amplifiers 43 and 44 at different amplification factors and the outputs of the amplifiers 43 and 45 are added together by an adder 45. The operation of the switching circuit 46 is same as that of the switching circuit 42 of FIG. 9.

In FIG. 11, the level of the read signal 1C is reduced by an attenuater 48 in the field mode to adjust the level to be equal to the level of the read signal in the frame mode. Numeral 47 denotes an adder and numeral 49 denotes a switching circuit.

While the FT-CCD has been described above, an IL-CCD (interline CCD) and a MOS CCD are briefly explained below.

Figure 12:
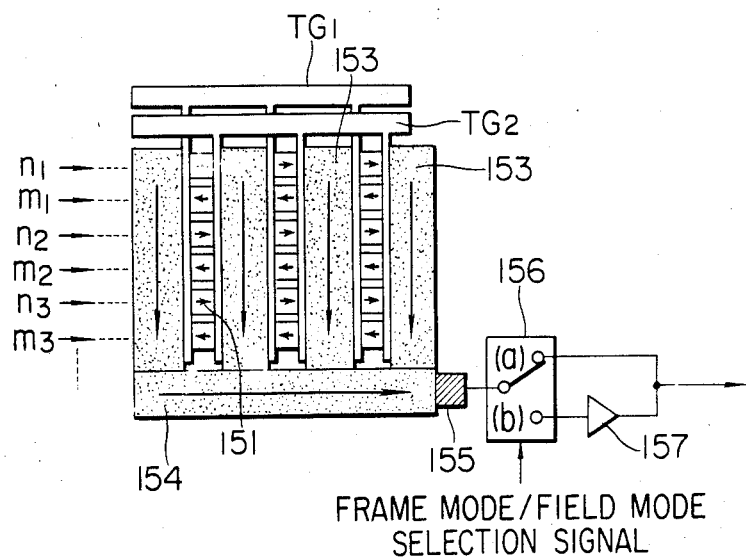
FIG. 12 shows a schematic view of an image pickup device which uses an interline type CCD array.

FIG. 12 shows a configuration of major portions of the second embodiment of the image pickup device of the present invention which uses the interline transfer type CCD (IL-CCD) array which can be used in the present invention. Numerals 151 and 152 denote photo-sensitive elements arranged in a matrix. Numeral 153 denotes vertical shift registers which receive electrical information from the photo-sensitive elements and vertically transfer it. Numeral 154 denotes a horizontal shift register, numeral 155 denotes an output amplifier, numeral 156 denotes a switching circuit as the switching means of the embodiment of the present invention and numeral 157 denotes a gain control amplifier.

TG1 and TG2 denote gate electrodes. The electrode TG1 forms a path to supply the electrical information of the even lines of photo-sensitive elements to the vertical shift registers. The gate TG2 forms a path to supply the electrical information of the odd lines of photo-sensitive elements to the vertical shift registers.

In the still video mode, after the image has been picked up and the shutter has been closed, the information charges of the photo-sensitive elements ($n_1, n_2, \ldots$) corresponding to the odd fields are transferred to the vertical shift registers 153 through the gate electrode TG2 and they are read out from the horizontal register 154 for each horizontal period and outputted from the on-chip amplifier 155 as the odd field CCD output signal. When all of the odd field signals have been read out, the CCD output signal of the even field ($m_1, m_2, \ldots$) is read out through the gate electrode TG1 in the next even field period. This mode is called the frame mode and the information charge photo-electrically converted in the frame mode is represented by C1.

In the field mode of the still video mode, the information charges of a pair of adjacent odd field and even field are added together by the vertical register 153 and outputted from the horizontal register 154, thence from the on-chip amplifier 155. The information charge C2 is represented by $C1 = \frac{1}{2}C2$.

As described above, since the amounts of the information charges in the frame mode and the field mode of the still video mode are different, the switching circuit 156 and the amplifier 157 are provided to adjust the levels of the CCD output signals. In the frame mode, the switching circuit 156 selects the contact (b) and the read signal is adjusted to the same level as the read signal of the field mode by the amplifier 157 and it is then supplied to the AGC.

Figure 13:
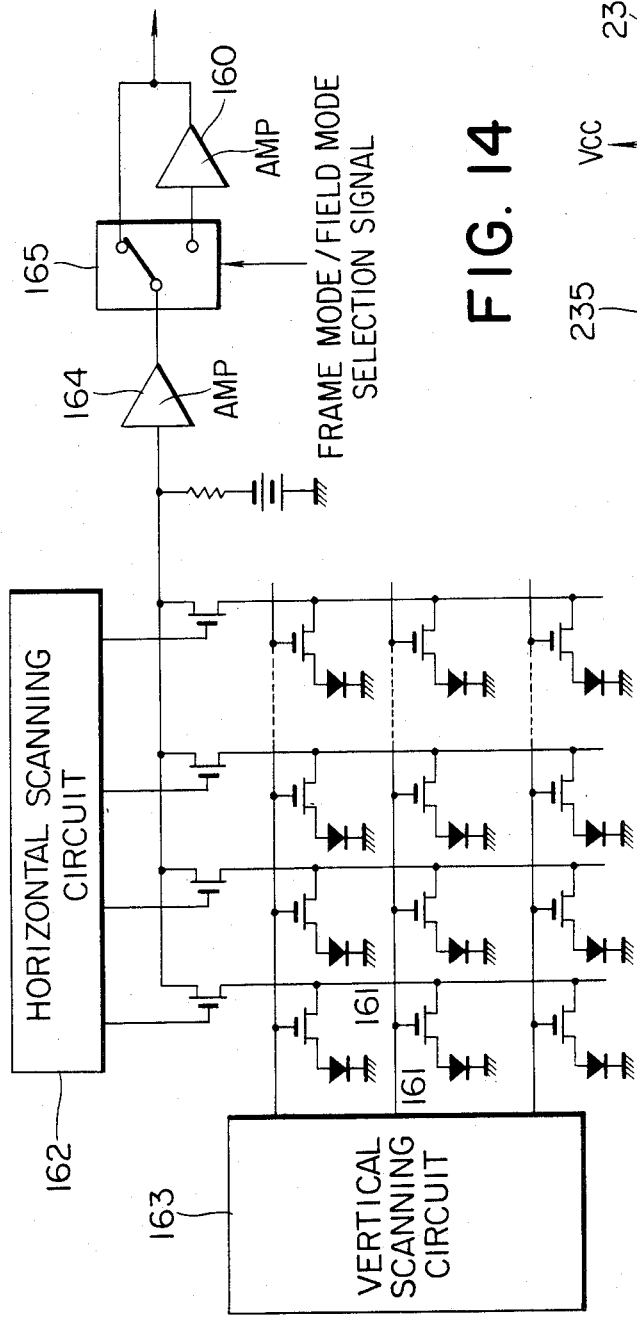
FIG. 13 shows, a schematic view of an image pickup device which uses a MOS solid-state image pickup array.

FIG. 13 shows a configuration of a MOS type solid-state image pickup device of the present invention.

The MOS type image sensor comprises photosensitive elements 161, a vertical scanning circuit 163 and a horizontal scanning circuit 162. The operation of the MOS type image sensor has been well known and the description thereof is omitted. Since it is basically X-Y scan type, it can readily attain the frame mode and the field mode in which the signal charges of the two adjacent cells are combined.

Since the signal level of the read signals in those modes are different as described above, it is necessary to adjust the levels in the respective modes.

The levels of the read signals of those modes are adjusted by routing or not routing the signal to an amplifier 166 through a switching circuit 165.

As described above, according to the embodiments of the present invention, when the first mode in which the signal charges of the adjacent photo-electric conversion cells of the solid-state image pickup device are combined and the second mode in which the signal charges of the respective cells are separately read out are used, the amplification factors to the read signals in the both modes are adjusted so that the same level of signals are produced in the respective modes. Accordingly, the construction of the AE controller of the video camera is simplified.

Further, the degradation of the image quality due to the difference of the levels of the read signals is prevented.

As shown in FIG. 10, since the levels are adjusted for the odd field and the even field in the frame mode, the flicker on the image reproduced by a television receiver is prevented.

Figure 14:
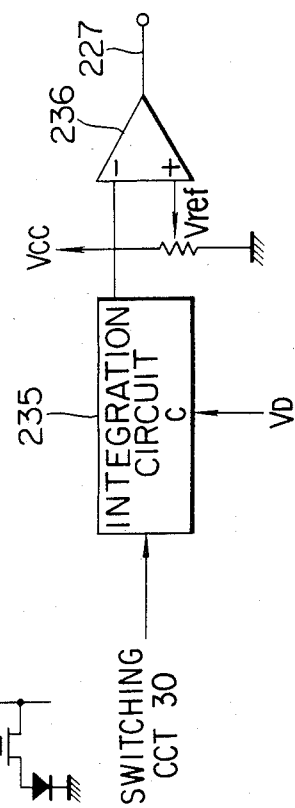
FIG. 14 shows a schematic view of the AE controller 16 of FIG. 8.

FIG. 14 shows a circuit diagram of major portions of the AE controller 16 of FIG. 8. It shows an embodiment of a discrimination circuit for determining the luminance. Numeral 235 denotes an integration circuit for integrating a video signal supplied from the image pickup device through the switching circuit 30, and numeral 236 denotes a comparator. A reference voltage $V_{ref}$ is applied to one terminal of the comparator 236.

The video signal is integrated by the integration circuit 235 and the output thereof is compared with the reference voltage $V_{ref}$ by the comparator 236 to determine if the luminance is low or not. The integration circuit 235 is cleared for every field by a vertical synchronizing signal $V_D$ from the synchronizing signal generator 13.

Figure 15:
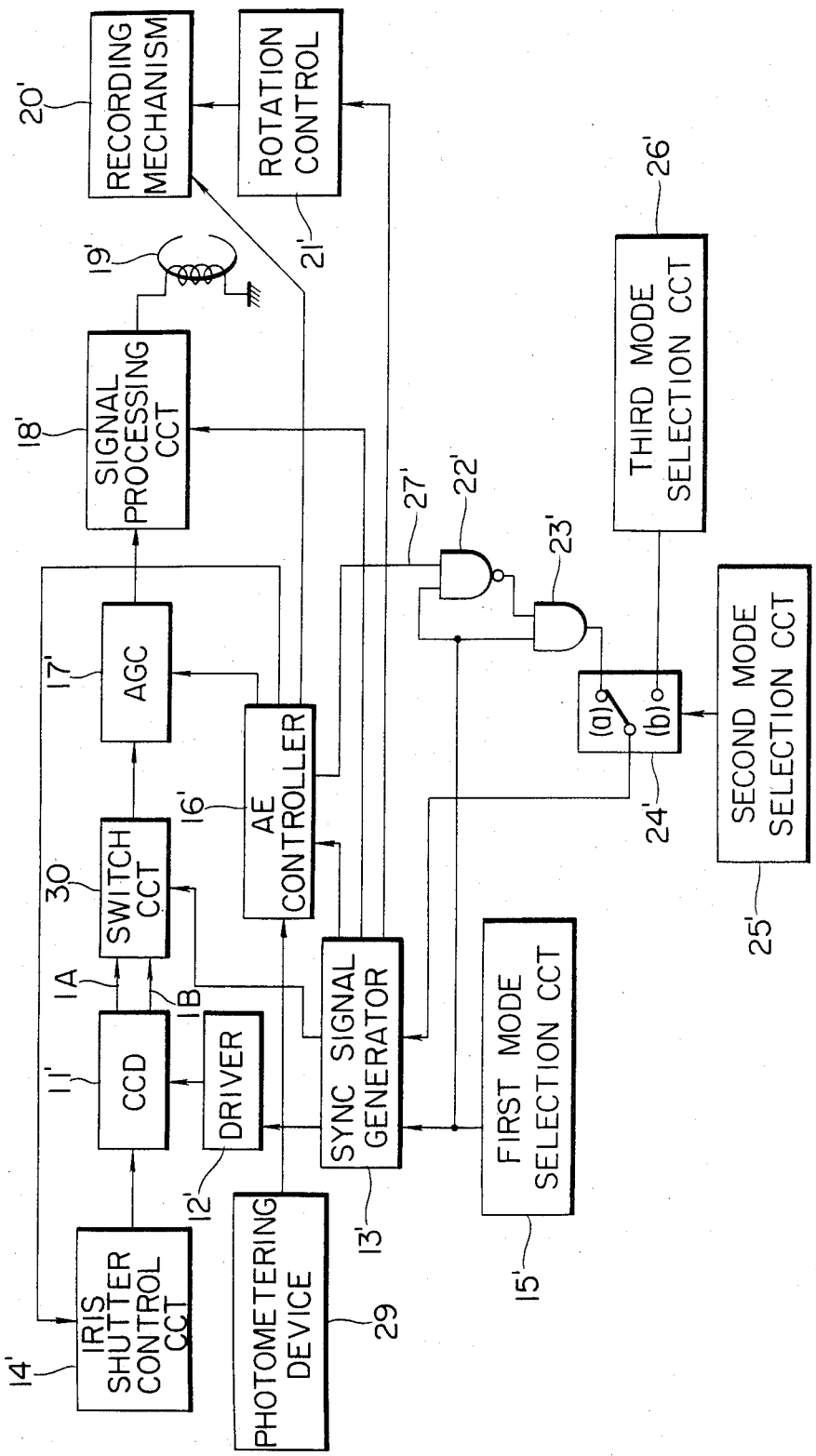
FIG. 15 shows a schematic view of a control circuit of the image pickup device.

FIG. 15 shows an embodiment of a control circuit of the image pickup device which carries out the AE control of FIG. 8 without the output of the image pickup unit. The like elements to those shown in FIG. 8 are designated by the like numerals with primes (') added. Numeral 29 denotes a photo-metering device such as a silicon photo-diode. The output of the photometering device 29 is supplied to the AE controller 16' which controls the AGC circuit 17' and the iris/shutter control circuit 14'. When the still video mode and the auto-selection mode are selected, the AE controller 16' produces an "H" level signal on the output line 27' to automatically select the field mode, if the output of the photo-metering device 29 is low, that is, if the luminance of the subject image is low. When the output of the photometering device 29 is high, that is, when the luminance of the subject image is high, the AE controller 16' produces an "L" level signal on the output line 27' to automatically select the frame mode.

In the embodiment of FIG. 15, means photo-metering or partial photometering can be selected by selectively using a plurality of photometering devices arranged at different positions as is done in a conventional camera device.

As described above, in accordance with the embodiment of the present invention, the first mode in which the signal charges of at least two adjacent ones of the plurality of photo-electric conversion cells of the image pickup unit are combined and the second mode in which the signal charges of the respective photo-electric conversion cells are separately read out can be selectively used.

Accordingly, it is possible to produce a high resolution, sharp image or a high S/N ratio signal by the addition, depending on the application. When the luminance of the subject is low, the first mode is selected so that a high S/N ratio signal is produced for the low luminance subject.

What we claim is:
1. An image pickup device comprising:
   (a) image pickup means for converting optical image information to electrical frame image information comprising field image information and accumulating the electrical frame image information;
   (b) a plurality of readout means for reading out respective electrical field image information which constitutes different portions of the frame image information; and
   (c) switching means for selectively supplying the field image information from said readout means to a common signal path at a field interval.

2. An image pickup device according to claim 1 wherein said plurality of readout means each includes conversion means for converting the electrical image information of said image pickup means to a predetermined electrical signal.

3. An image pickup device according to claim 1 wherein said plurality of readout means each includes a horizontal shift register.

4. An image pickup device according to claim 1 wherein said image pickup means include a plurality of photo-electric conversion cells arranged in a matrix.

5. An image pickup device according to claim 4 wherein said plurality of readout means are arranged to independently read out the image information of predetermined lines of said plurality of cells arranged in matrix.

6. An image pickup device according to claim 5 wherein said image pickup means includes an image pickup unit to which the optical image information is applied and an optically shielded memory unit for storing the image information accumulated in said image pickup unit, and at least one of said plurality of readout means is arranged between said image pickup unit and said memory unit.

7. An image pickup device comprising:
   (a) image pickup means for converting optical image information to electrical image information and accumulating the electrical image information;
   (b) addition control means for adding the electrical image information accumulated at different portions of said image pickup means;
   (c) instruction means for instructing the addition control operation by said addition control means; and
   (d) level adjusting means responsive to the instruction by said instruction means for adjusting levels of the electrical image information from said image pickup means.

8. An image pickup device according to claim 7 wherein said addition control means includes an image pickup means drive circuit for adding predetermined portions of the electrical image information accumulated in said image pickup means.

9. An image pickup device according to claim 7 wherein said image pickup means includes a plurality of photo-electric conversion cells arranged in a matrix.

10. An image pickup device according to claim 9 wherein said addition control means adds the image information of a predetermined line of said plurality of cells arranged in matrix to the image information of another predetermined line.

11. An image pickup device according to claim 7 wherein said instruction means includes a manually operated switch.

12. An image pickup device according to claim 7 wherein said instruction means include luminance discrimination means for detecting a luminance of a subject and producing a signal to cause said addition control means to carry out the addition control operation when the luminance of the subject is lower than a predetermined level.

13. An image pickup device according to claim 7 wherein said level adjusting means includes a variable gain amplifier.

14. An image pickup device according to claim 7 wherein said level adjusting means adjusts the levels of the electrical image information such that the levels of the electrical image information are equal without regard to the addition control operation.

* * * * *

UNITED STATES PATENT AND TRADEMARK OFFICE
CERTIFICATE OF CORRECTION

PATENT NO. : 4,603,354

DATED : July 29, 1986

INVENTOR(S) : Seiji Hashimoto, et al.

It is certified that error appears in the above-identified patent and that said Letters Patent is hereby corrected as shown below:

Column 1, line 58, delete "a".

Column 3, line 16, change "aclled" to --called--.

Column 8, line 61, after "[4.3]" insert a space.

Column 8, line 65, after "[4.3]" insert a space.

Column 9, line 6, after "[4.4]" insert a space.

Column 9, line 14, after "[4.4]" insert a space.

Signed and Sealed this

Twenty-third Day of December, 1986

Attest:

DONALD J. QUIGG

*Attesting Officer*  *Commissioner of Patents and Trademarks*